A. OELSNER.
DEVICE FOR OPENING AND CLOSING THE HOODS OF MOTOR CARS.
APPLICATION FILED DEC. 27, 1921.
1,437,351.
Patented Nov. 28, 1922.
3 SHEETS—SHEET 1.
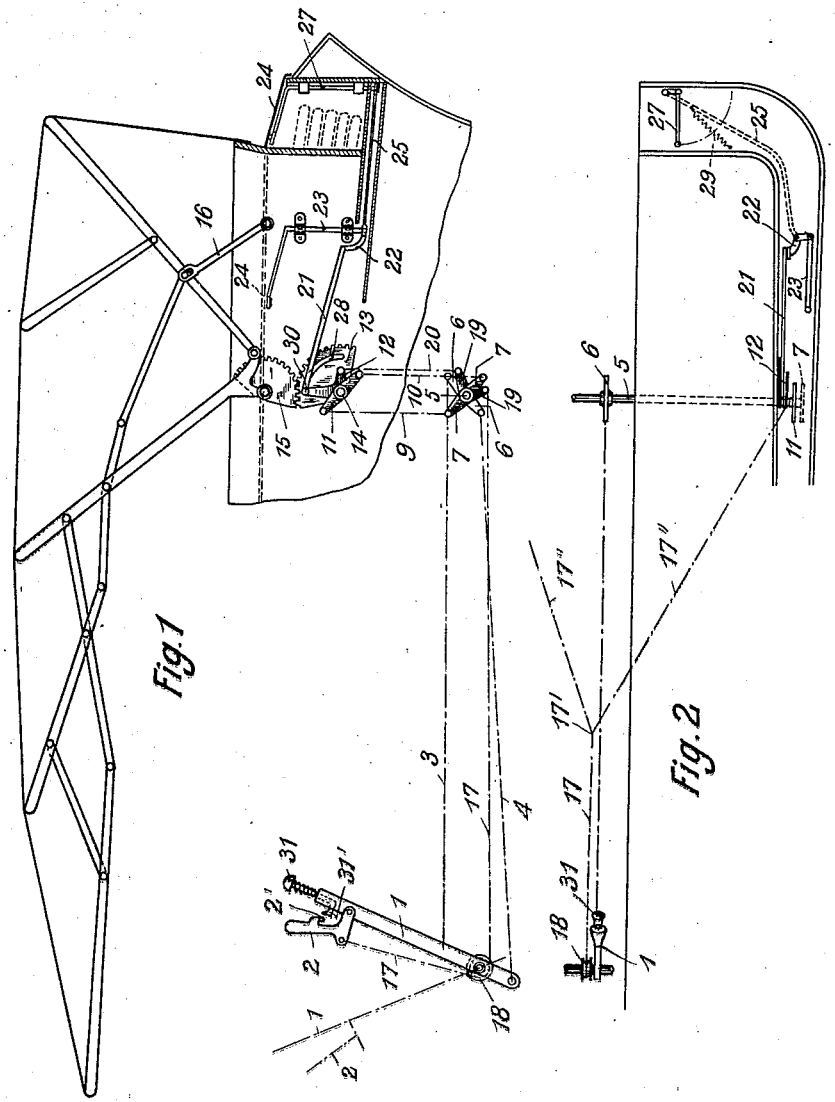
Inventor
Anton Oelsner

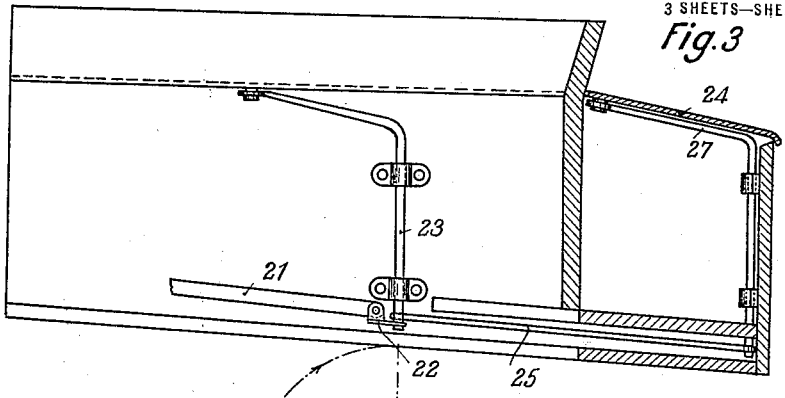
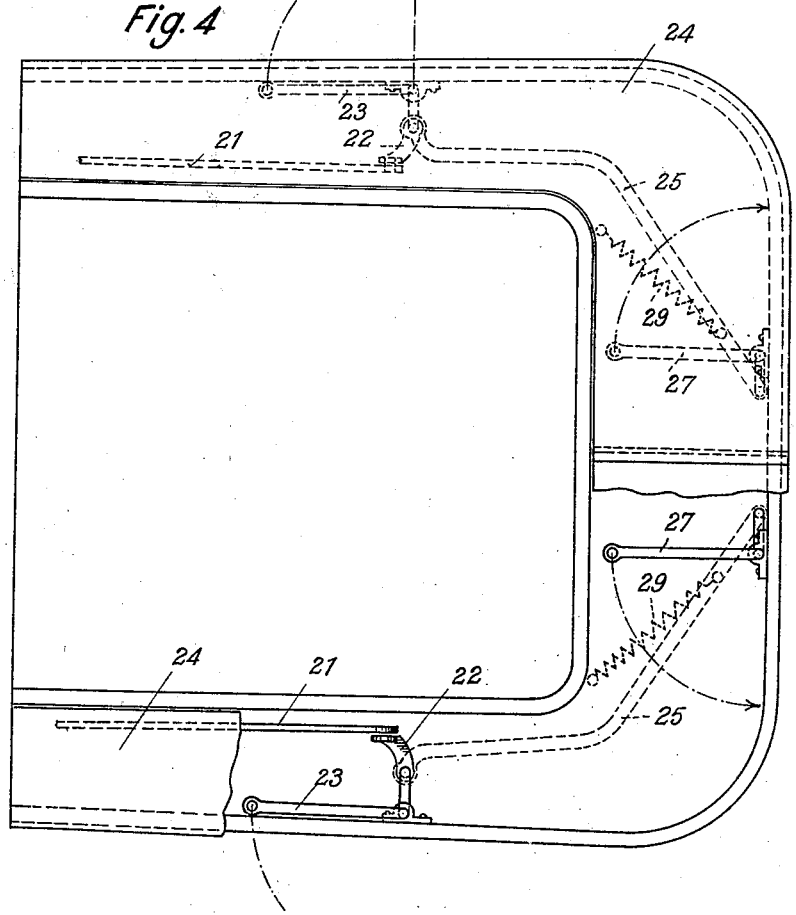

A. OELSNER.
DEVICE FOR OPENING AND CLOSING THE HOODS OF MOTOR CARS.
APPLICATION FILED DEC. 27, 1921.
1,437,351.
Patented Nov. 28, 1922.
3 SHEETS—SHEET 3.
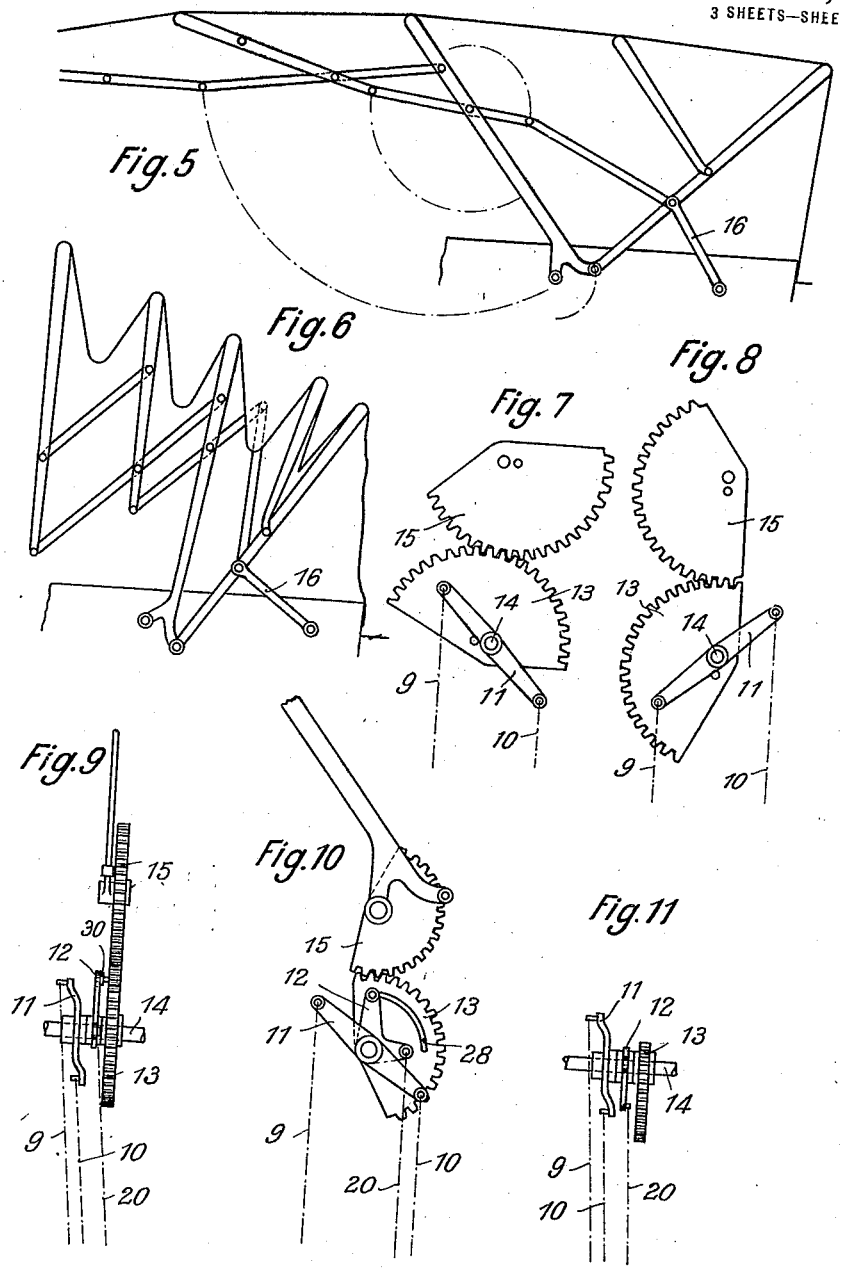
INVENTOR
ANTON OELSNER Patented Nov. 28, 1922.

1,437,351

UNITED STATES PATENT OFFICE.

ANTON OELSNER, OF GERA-UNTERMHAUS, GERMANY, ASSIGNOR TO RICHARD EMIL GOLDE, OF GERA-REUSS, GERMANY.

DEVICE FOR OPENING AND CLOSING THE HOODS OF MOTOR CARS.

Application filed December 27, 1921. Serial No. 525,130.

*To all whom it may concern:*

Be it known that I, ANTON OELSNER, a citizen of Germany, residing at Gera-Untermhaus, Germany, have invented certain new and useful Improvements in a Device for Opening and Closing the Hoods of Motor Cars, of which the following is a specification.

The invention relates to devices for opening and closing the hoods of motor cars and particularly to those whereby an actuating of the hoods is effected from the driver's seat by means of a lever. The characteristic feature of the invention consists therein that the lever acts also on the lid of the box which receives the folded hood in order to open and close said box.

By thus constructing the device the advantage is obtained that by a single action from the driver's seat not only the hood can be opened and closed but also the corresponding movements of the box lid be effected.

Upon the accompanying drawings one mode of carrying out the invention has been illustrated by way of example, and it shows:

Fig. 1 a side view of the device partly in section,

Fig. 2 is a plan of Fig. 1,

Fig. 3 shows a section through the hood box on a larger scale,

Fig. 4 is a plan of Fig. 3,

Fig. 5 is a view of the hood alone, wherein the direction of the movement of some centres of motion have been indicated by dotted lines, Fig. 6 shows the hood while it is being folded together, Figs. 7 and 8 show the toothed gearing for the hood in two different positions, Fig. 9 is the front view of the toothed wheels on a smaller scale with the levers belonging thereto and a part of the main member of the hood frame, Fig. 10 is a side view of Fig. 9, while Fig. 11 shows a toothed sector alone in a position different from that shown in Fig. 9.

A hand lever 1 is movably fixed to the bottom of the driver's seat. Above the journal a pulling rope 3 and below same a pulling rope 4 is attached to said hand lever. Both ropes are connected to a double armed lever 6 (Figs. 1 and 2) rigidly mounted on a spindle. To both ends of the spindle 5 double armed levers 7 are fixed which by means of ropes 9 and 10 are connected to levers 11 arranged on the right and left side of the carriage box. On the journals 14 of these levers toothed segments 13 and the bell crank lever 12 have been mounted.

The toothed segments 13 mesh with the toothed segments 15 which are rigidly connected to the principal member of the hood. To the back member of the hood a supporting strut 16 is movably connected, the lower end of which being movably attached to the carriage side. The parts described in the aforegoing solely serve to actuate the hood. For actuating the lid 24 of the hood box the following arrangement has been made:

In addition to the elements 3 and 4 for actuating the hood, the hand lever 1 has been fitted in the illustrated mode or example with a further organ, viz. a rope 17 which is attached to an auxiliary lever 2. This lever 2 is movably attached to the upper end of the lever 1 and fitted with a hook 2' which can be made to lock with a pawl 31' mounted on a spring actuated bolt 31.

The rope 17 passes over the guide roller 18, mounted on the journal of the lever 1, up to a point 17', where it is divided into two ropes 17''. Each of the two ropes 17'' is attached to a bell crank lever 19 movably mounted on one end of the spindle 5. The bell crank lever 19 is by means of a rope 20 connected to a bell crank lever 12 movably mounted on the pin 14.

The lid 24 of the hood box consists of two parts which are movably mounted on swinging arms 23 and 27 (Figs. 3 and 4.) These swinging arms have been mounted in the interior of the hood box and to the outer walls thereof. The arms have been cranked on their lower ends and to the crank ends connecting rods 25 have been attached, connecting one swinging arm 23 each with one swinging arm 27. To the crank of the swinging arm 23 is in addition to the connecting rod 25 an angle 22 attached which by means of a pushing rod 21 is connected to the bell crank lever 12 with the aid of the guide pin 30. The guide pin 30 engages with a slot 28 of the toothed segment 13.

To the connecting rods 25 springs 29 are fastened which have the tendency to open the lid-halves of the box. The lid-halves of the box can however only move if the slots 28 of the toothed segments 13 are in such a position that the pin 30 is able to follow the movement of the box lid.

The device works in the following manner:

When a pressure is exerted on the pin 31, the auxiliary lever 2 moves quickly forward and the divided lid of the hood box is opened by the springs 29. The hand lever 1 is then pulled whereby the hood is raised until it is completely stretched and at the same time the lid of the box closed owing to the pushing rod 21 being moved by the pin 30 which has entered the slot of the toothed segment 13. The supporting stays attached to the back member of the hood frame hold the hood in a folded condition until it is lifted out when the box has been opened. The stretching of the hood cannot take place until it has been lifted out of the box.

When the hand lever 1 is pushed back the lid of the hood box is opened under the action of the springs 29, as the position of the slot 28 alters when this lever is pushed back. The hood is folded together, as shown in Fig. 6, whereby the supporting stays 16 hold the hood above the box until it is completely folded up. Not until the hood has been folded up does it slide into the box. By pulling the auxiliary lever 2 on the hand lever 1 the lid of the hood box is closed with the assistance of the rod 21. The auxiliary lever 2 by means of the hook 2' thereon engages with the pawl 31'.

I claim:

1. In a device for opening and closing the hoods of motor cars an operating lever, said lever being supplied with suitable connecting means adapted to operate the frame members of the hood, a box receiving the folded hood, a lid upon said box, an actuating device for said lid, said actuating device including operating means carried by the operating lever.

2. In a device for opening and closing the hoods of motor cars an operating lever, said lever being connected to the driving wheels of the frame members of the hood by ropes and levers, a box receiving the folded hood, a lid upon said box, an actuating device for said lid, said actuating device including an operating device carried by the said operating lever and a rod connection extending to the said operating device.

3. In a device for opening and closing the hoods of motor cars an operating lever, said lever being connected to the driving wheels of the frame members of the hood by ropes and levers, a box receiving the folded hood, a lid upon said box, an actuating device for said lid, said actuating device including an operating device on the said operating lever and ropes and pushing rods, said pushing rods engaging with guide slots in said driving wheels.

4. In a device for opening and closing the hoods of motor cars an operating lever, said lever being connected to the driving wheels of the frame members of the hood by ropes and levers, a box receiving the folded hood, a lid consisting of two parts upon said box, an actuating device for said lid, said actuating device consisting in horizontal arms swinging around a vertical axis and supporting on their free ends the parts of the lid, springs adapted to move the horizontal arms into the opening position said arms having pushing rods engaging with guide slots in said driving wheels and being connected by ropes to an auxiliary lever on said operating lever.

5. In a device for opening and closing the hoods of motor cars an operating lever, said lever being connected to the driving wheels of the frame members of the hood by ropes and levers, a box receiving the folded hood, a lid consisting of two parts upon said box, an actuating device for said lid, said actuating device consisting in horizontal arms swinging around a vertical axis and supporting on their free ends the parts of the lid, the horizontal arms on each side of the car being connected by rods, springs connecting said rods with a fixed point of the box, said springs being adapted to move the horizontal arms into the opening position, one of said arms on each side of the car having a pushing rod, engaging with a guide slot in the driving wheel of the same side of the car and being connected by ropes to an auxiliary lever on said operating lever.

6. In a device for opening and closing the hoods of motor cars an operating lever, said lever being supplied with suitable connecting means adapted to operate the frame members of the hood, a box receiving the folded hood, the back member of said frame having a supporting stay on both sides of the car connecting it with fixed points of said car, a lid upon said box, an actuating device for said lid, said actuating device including an operating device mounted on and carried by said operating lever.

7. In a device for opening and closing the hoods of motor cars an operating lever, said lever being connected by ropes to the driving wheels of the frame members of the hood, the driving and driven toothed segment being supported eccentrically and in opposite sense to each other, a box receiving the folded hood, a lid upon said box, an actuating device for said lid, said actuating device including an operating device mounted on and carried by the said operating lever.

In testimony whereof, I have hereunto set my hand.

ANTON OELSNER.

Witness:
RUD E. FRICKER.